June 24, 1930.  I. A. WILLARD  1,767,195
CONTAINER FOR POWER UNITS
Filed Sept. 8, 1926  3 Sheets-Sheet 1
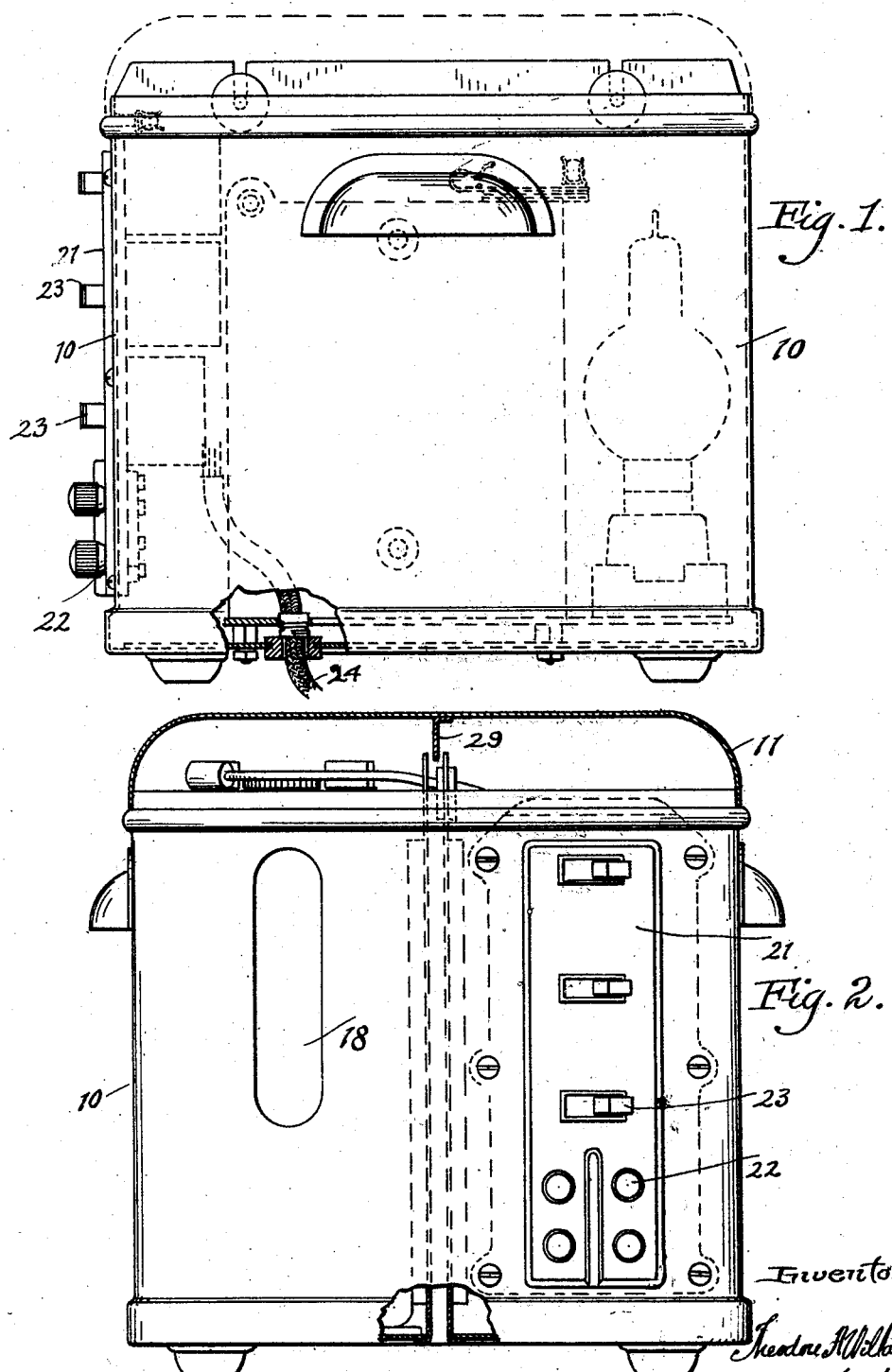

June 24, 1930.　　　T. A. WILLARD　　　1,767,195
CONTAINER FOR POWER UNITS
Filed Sept. 8, 1926　　　3 Sheets-Sheet 3

Inventor.
Theodore A. Willard
by

Patented June 24, 1930

1,767,195

UNITED STATES PATENT OFFICE

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA

CONTAINER FOR POWER UNITS

Application filed September 8, 1926. Serial No. 134,303.

This invention relates to what may be termed a power unit adapted particularly for radio receiving sets, said unit consisting of a case equipped with a storage battery for supplying current to the tubes when the set is in use and a charger for charging the battery when the set is not in use, this charger being generally known as a trickle charger which charges the battery at a low rate.

The invention relates particularly to certain features of construction and arrangement by which the battery and charger may be employed effectively in the same case and without liability of heat transference between the compartments containing respectively the battery and charger, and without liability of acid being carried over in a finely divided state from the battery compartment to the charger compartment.

The invention may be here briefly summarized as consisting in novel details of construction and combinations and arrangements of parts which will be described in the specification and set forth in the appended claims.

Figure 3:
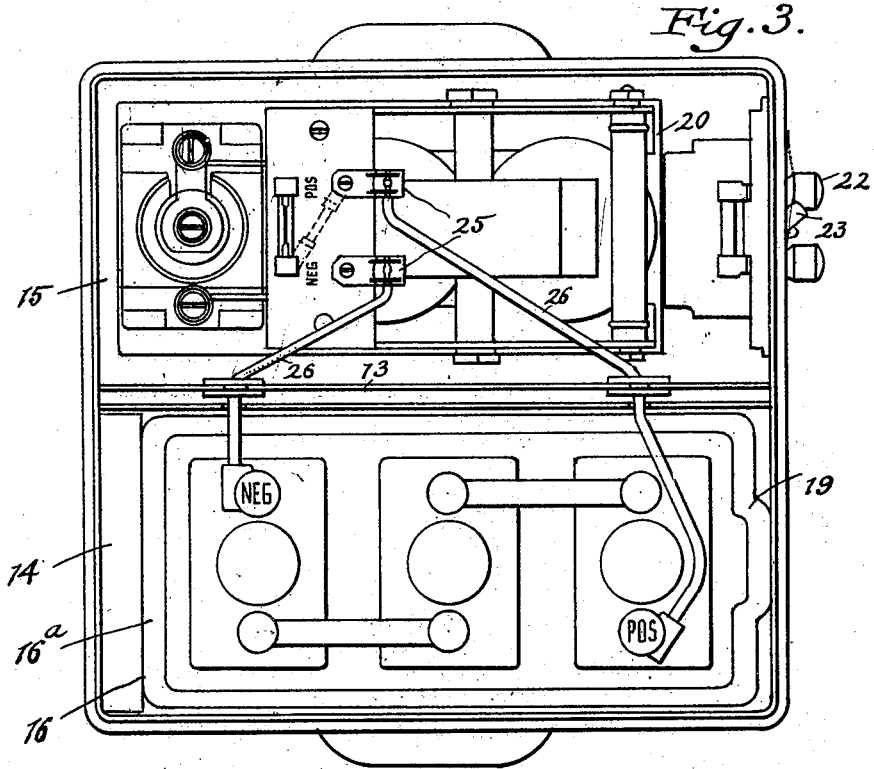
Figure 4:
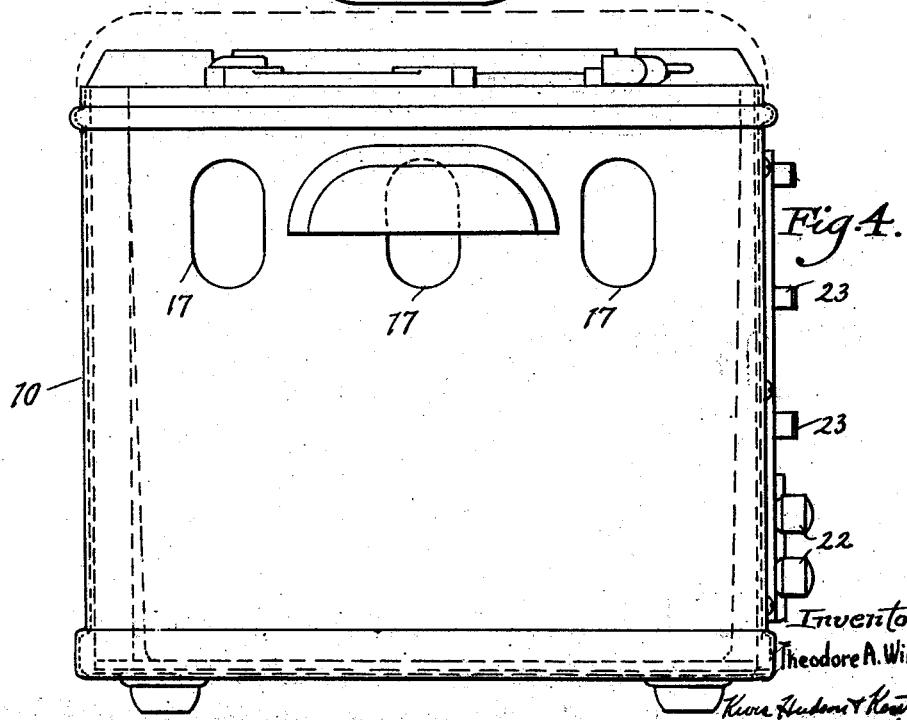
Figure 6:
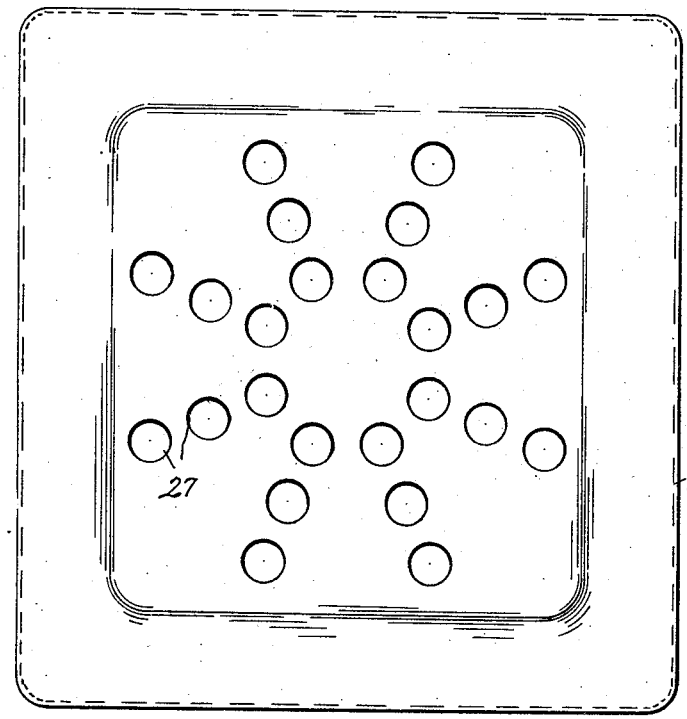
Figure 5:
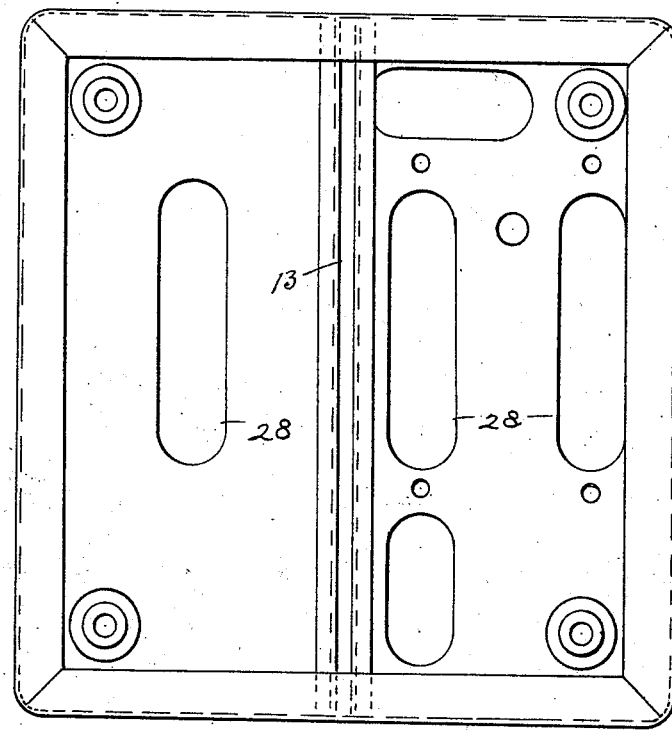

In the accompanying sheets of drawings in which I have illustrated an embodiment which operates with high efficiency Fig. 1 and Fig. 2 are two side views with parts in section, the cover being shown by dotted lines in Fig. 1; Fig. 3 is a top plan view with the cover removed; Fig. 4 is a side view looking toward the opposite side to that shown in Fig. 1; Fig. 5 is a bottom view of the case, and Fig. 6 is a top plan view of the cover.

Referring now to the drawings, the unit includes a case 10 which is preferably formed of sheet metal in rectangular shape and is provided with a sheet metal cover 11. The interior of the case is divided preferably by a vertical, double walled partition into a battery compartment 14 and a charger compartment 15.

In the compartment 14 is located a storage battery 16 which may have any number of cells, but in this instance it is provided with three cells. While the cells of the battery may have individual containers or jars, in this instance I employ a single multi-compartment glass jar 16$^a$, and the side of the container 10 opposite the three compartments is provided with elongated slots 17 through which the acid level of the cells can be seen.

Additionally, the end wall is preferably provided with a slot 18 opposite one of the end cells, and through this slot may be seen gravity indicators placed in the end cell to indicate the specific gravity of the electrolyte, this end cell being provided with an extension 19 (see Fig. 3) to accommodate the indicators which are preferably in the form of balls capable of rising or sinking in the electrolyte as the specific gravity is varied.

In the compartment 15 a charger 20 is provided. This charger may be of any suitable construction, the details of which are immaterial to the present invention and it may have any suitable rectifying device. In one of the end walls of the compartment 15 a switch panel 21 is provided, (see Fig. 2), which panel is equipped with suitable binding posts 22 and switches 23 by which the battery may be connected to the receiving set or to the charger, the two sets of binding posts and the three switches making it possible also to disconnect the battery in compartment 14 from the charger and to connect the charger to an outside battery, such as a B battery. Connection is made from the charging circuit to the charger by means of a cable 24 (see Fig. 1) which extends up through the bottom of the charger compartment 15.

At the upper end of the charger two terminals 25 are provided, these being adapted to be connected by means of the switches 23 either to the receiving set or through the charger to the charging circuit these terminals being connected by conductors 26 to the positive and negative terminals of the battery. It will be observed that the double walled partition 13 projects up above the top of the container body (note particularly Figs. 1, 2 and 4) and that the conductors 25 extend through openings in the partition a suitable distance down from the top thereof.

The two walls forming the partition 13 are spaced apart forming a flat, vertically disposed air duct open both at the top and the bottom so that it is possible for a stream of air to pass upwardly between the battery compartment and the charger compartment, thus minimizing the heat transference between the two compartments, the escape of warm air at the top being facilitated by a large number of ventilating openings 27 (Fig. 5) provided in the cover. The bottom walls of both compartments may be provided with openings 28 (Fig. 6), so that there may be an upward circulation of air through the compartments themselves as well as between the walls forming the partition 13.

Additionally, the cover is preferably provided with a baffle 29, which, when the cover is in place, extends down for a short distance between and beneath the upper edges of the walls forming the partition 13, thus minimizing the likelihood of acid in spray form being carried over from the battery compartment to the charger compartment.

By the above arrangement the parts constituting the unit are compactly arranged, it being possible by reason of the central air duct to have the battery and charger close together without liability of the charger heating the battery, and by the overlapping arrangement of the baffle and the top edges of the double walled partition the charger is not likely to be injured by acid even though the two compartments are not wholly separated.

While I have shown the preferred embodiment of the invention, I do not desire to be limited to the precise details shown, but aim in my claims to cover all modifications which do not involve a departure from the spirit and scope of my invention.

Having thus described my invention, I claim:

1. A container having two compartments with a double walled, vertical partition separating the compartments, said double walled partition forming a vertical air duct open at the top and extending through the bottom of the container.

2. A container comprising a case having a vertically disposed double walled partition dividing the case into two compartments, and forming an open air duct between the compartments extending upwardly through the bottom of the container, and provided with a cover having on the under side thereof a baffle which fits into the space between the two walls of the partition and is spaced from each of them.

3. A container having a vertical partition forming two compartments, said partition comprising two spaced walls, and a cover having a baffle extending downwardly between and spaced from the walls of said partition.

In testimony whereof, I hereunto affix my signature.

THEODORE A. WILLARD.